US011040318B2

(12) United States Patent
Salas Arranz et al.

(10) Patent No.: US 11,040,318 B2
(45) Date of Patent: Jun. 22, 2021

(54) LIQUID MIXING DEVICE WITH ELECTRONIC CONTROL OF HIGH DYNAMIC REGULATION AND OPERATING METHOD THEREOF

(71) Applicant: SEDAL, S.L.U., Sant Andreu de la Barca (ES)

(72) Inventors: Isaac Salas Arranz, Sant Cugat del Vallès (ES); Rafael Bello Larroche, Martorell (ES)

(73) Assignee: SEDAL, S.L.U., Sant Andreu de la Barca (ES)

( * ) Notice: Subject to any disclaimer, the term of this patent is extended or adjusted under 35 U.S.C. 154(b) by 68 days.

(21) Appl. No.: 16/445,412

(22) Filed: Jun. 19, 2019

(65) Prior Publication Data
US 2019/0381464 A1 Dec. 19, 2019

(30) Foreign Application Priority Data

Jun. 19, 2018 (ES) ............................... ES201830599

(51) Int. Cl.
*B01F 3/08* (2006.01)
*B01F 15/00* (2006.01)
(Continued)

(52) U.S. Cl.
CPC ........ *B01F 3/088* (2013.01); *B01F 15/00136* (2013.01); *B01F 15/00175* (2013.01);
(Continued)

(58) Field of Classification Search
CPC .......... G05D 23/1393; G05D 23/1928; G05D 23/1931; G05D 23/1935; B01F 3/088;
(Continued)

(56) References Cited

U.S. PATENT DOCUMENTS

| 4,193,291 A | * | 3/1980 | Lynnworth | ............... | G01F 1/20 376/245 |
| 4,850,220 A | * | 7/1989 | Asano | ..................... | A61M 1/16 73/196 |

(Continued)

FOREIGN PATENT DOCUMENTS

| DE | 19600455 A1 | 7/1997 |
| EP | 2775220 A2 | 10/2014 |
| EP | 2990736 A1 | 2/2016 |

OTHER PUBLICATIONS

Spanish Patent Office; Spanish State of Art Report for Spanish Patent Application No. 201830599; dated Apr. 22, 2019.

*Primary Examiner* — William M McCalister
(74) *Attorney, Agent, or Firm* — Thomas E. Lees, LLC

(57) ABSTRACT

The present invention relates to a liquid mixing device which has a control system and electronic regulation, in charge of receiving the parameters set with respect to the liquid which is expected to be supplied by the tap or supply means whereto said device is connected and which acts on the regulation means of the different supply lines of liquids to mix to achieve said parameters, which has a high measurement and actuation dynamic thanks to measuring sections with ultrasonic transducers and proportional solenoid valves and a configuration and geometry of said measuring sections which allows having a multitude of reliable measurements per second.

13 Claims, 4 Drawing Sheets

(51) Int. Cl.
*G01F 1/66* (2006.01)
*G01F 15/02* (2006.01)
*G05D 7/06* (2006.01)
*G05D 23/19* (2006.01)

(52) U.S. Cl.
CPC ........ *B01F 15/00344* (2013.01); *G01F 1/66* (2013.01); *G01F 15/02* (2013.01); *G05D 7/0652* (2013.01); *G05D 23/1931* (2013.01); *Y10T 137/2499* (2015.04); *Y10T 137/7737* (2015.04)

(58) Field of Classification Search
CPC ........ B01F 15/00136; B01F 15/00175; B01F 15/00344; G01F 1/66; G01F 1/662; G01F 1/668; G01F 7/0652; G01F 15/02; G01F 15/003; G01F 15/005; E03C 1/044; E03C 2001/0418; F24D 17/00; F24D 19/1051; Y10T 137/2499; Y10T 137/2509; Y10T 137/7737
USPC .......................................... 137/88, 93, 468
See application file for complete search history.

(56) References Cited

U.S. PATENT DOCUMENTS

| | | | | |
|---|---|---|---|---|
| 5,369,998 | A * | 12/1994 | Sowerby | G01F 1/66 73/861.04 |
| 5,814,736 | A * | 9/1998 | Loschberger | G01F 1/662 73/861.25 |
| 5,824,915 | A * | 10/1998 | Hujzer | G01F 1/662 73/861.27 |
| 5,856,622 | A * | 1/1999 | Yamamoto | G01F 1/66 702/48 |
| 5,962,790 | A * | 10/1999 | Lynnworth | G01F 1/662 73/644 |
| 6,186,179 | B1 * | 2/2001 | Hill | F15D 1/0005 138/39 |
| 6,343,511 | B1 * | 2/2002 | Lynnworth | G01F 1/662 73/644 |
| 6,397,683 | B1 * | 6/2002 | Hagenmeyer | G01F 1/662 73/861.18 |
| 2002/0104384 | A1 * | 8/2002 | Bekkum | G01F 1/662 73/861.23 |
| 2004/0113523 | A1 * | 6/2004 | Hashimoto | G10K 11/02 310/326 |
| 2004/0182439 | A1 | 9/2004 | Popper et al. | |
| 2006/0016243 | A1 * | 1/2006 | Nevius | G01F 1/66 73/1.16 |
| 2007/0007862 | A1 * | 1/2007 | Adachi | G01F 1/662 310/348 |
| 2010/0154560 | A1 * | 6/2010 | Mueller | G01F 1/662 73/861.18 |
| 2011/0000311 | A1 * | 1/2011 | Petroff | G01F 1/662 73/861.28 |
| 2011/0072910 | A1 * | 3/2011 | Hueftle | F02D 41/18 73/861.28 |
| 2011/0118995 | A1 * | 5/2011 | Berger | G01F 1/662 702/48 |
| 2012/0038248 | A1 * | 2/2012 | Mueller | G01F 1/662 310/337 |
| 2012/0266679 | A1 * | 10/2012 | Ao | G01F 1/662 73/644 |
| 2013/0091958 | A1 * | 4/2013 | Satou | G01F 1/667 73/861.01 |
| 2014/0137662 | A1 * | 5/2014 | Heinks | G01F 1/66 73/861.28 |
| 2014/0198822 | A1 * | 7/2014 | Sui | G01F 15/02 374/117 |
| 2014/0236533 | A1 * | 8/2014 | Drachmann | G01F 1/662 702/176 |
| 2015/0042210 | A1 * | 2/2015 | Nagareda | H01L 41/1132 310/334 |
| 2015/0260561 | A1 * | 9/2015 | Twerdowski | G01N 29/2412 73/861.18 |
| 2016/0003654 | A1 * | 1/2016 | Nam | G01F 1/66 73/861.18 |
| 2017/0115255 | A1 * | 4/2017 | Sathyanarayana | G01N 29/50 |
| 2018/0110913 | A1 * | 4/2018 | Loderer | A61B 5/01 |
| 2018/0149511 | A1 * | 5/2018 | Ploss | G01F 1/662 |
| 2018/0231501 | A1 * | 8/2018 | Findikoglu | G01N 29/043 |
| 2018/0348035 | A1 * | 12/2018 | Huang | G01F 15/00 |
| 2019/0100083 | A1 * | 4/2019 | Ghannam | G05D 23/1931 |
| 2019/0154480 | A1 * | 5/2019 | Schob | G01F 1/662 |
| 2019/0323919 | A1 * | 10/2019 | Fung-A Wing | E03B 7/072 |
| 2019/0381464 | A1 * | 12/2019 | Salas Arranz | B01F 15/00136 |

\* cited by examiner

LIQUID MIXING DEVICE WITH ELECTRONIC CONTROL OF HIGH DYNAMIC REGULATION AND OPERATING METHOD THEREOF

CROSS-REFERENCE TO RELATED APPLICATIONS

This application claims the benefit of Spanish Patent Application No. P201830599, filed Jun. 19, 2018, entitled "LIQUID MIXING DEVICE WITH ELECTRONIC CONTROL OF HIGH DYNAMIC REGULATION AND OPERATING METHOD THEREOF", the disclosure of which is hereby incorporated by reference.

The present invention relates to a liquid mixing device which has a control system and electronic regulation, in charge of receiving the parameters set with respect to the liquid which is expected to be supplied by the tap or supply means whereto said device is connected and which acts on the regulation means of the different supply lines of liquids to mix to achieve said parameters.

BACKGROUND

Within the use of liquid mixing, the most widespread and best-known application is included in the field of supply of domestic water. The traditional mixture of hot and cold water has been typically performed by means of a mechanical system of direct and manual actuation on one or several control levers of a tap, so that the user can thus vary the quantity and temperature of the mixed water that is supplied to them through the tap spout.

These manual systems, with clear limitations in obtaining comfort of the water supplied throughout the time of use, and in the prevention of possible risks associated to the water supply at a certain temperature, even though they have a manual regulation set by the user and it is maintained in said position, wherein in a first moment the desired water temperature and flow parameters of the water supplied are obtained, the possible variations in the supply conditions of the different lines, whether temperature and/or pressure of each one of them, would affect the temperature and flow of the mixture supplied without said manual regulation means having been modified.

Extreme conditions may even occur, such as the bursting or cut-off of a supply line, with the sudden interruption of the supply of the corresponding supply line, having in a very short time interval the passage of mixed water at a desired comfort temperature to have exclusively uninterrupted supply line water, whether cold or hot water. The consequences for the user are evident, and they may even have a thermal shock and severe burns.

To improve the stability of the mixed water supply to variations in the water supply conditions in the cold and hot water supply lines in domestic water applications, fundamentally pressure and temperature variations, water mixing devices with electronic control system are known in the state of the art which, typically, use the information gathered by one or several sensors located along the hydraulic installation, normally in the supply lines and/or the mixing chamber, to regulate the mixture to supply by means of one or several actuators, where said actuators vary and adjust the cold and hot water flow provided from each supply line to the mixture.

The array of sensors that collect the information in the electronic control systems of the known mixing devices, depending on the type and technology used, such as, for example, magnetic field generator turbines, helices and mechanical turbines or volumetric mechanical flowmeters, usually require a prudential time for the correct calculation of the parameter measured, where said calculation time may even vary within the sensor's valid measurement range, since the frequency of the signals that allow determining the fluid flow is normally directly proportional to the circulating flow. For example, in the regulation at low flows, changes in flows due to variations in the pressure conditions of the supply lines are determined with a significant delay which prevents a sufficiently fast reaction of the regulation elements to enable avoiding the comfort problems caused by changes in the indicated supply conditions.

Another example of sensors which have a considerable time delay between the actual instantaneous conditions of the parameter measured and the availability of the information regarding those actual conditions, can be found in conventional temperature sensors, which incorporate calibrated resistances or semiconductors that vary their impedance with the temperature, with these temperature-sensitive elements being encapsulated and, therefore, having a certain thermal inertia and impedance This delay is, in turn, variable and dependent on the fluid speed in the vicinity of the sensor due to the heat transmission of the medium to the sensor being related to the convention coefficient, that may significantly vary again with the fluid speed in the vicinity of the sensor. The time delay existing between the fluid conditions at a certain time and the moment wherein those conditions are reflected in the sensor measurement affect the possible speed of the regulation means in transitory situations of said conditions and in the consequences arising from said delay, as a mixture whose temperature does not coincide with the set-point temperature.

There are multiple technical executions typically used as regulation means, i.e. different types of actuators that perform the variation and adjustment of the passage flow value of each supply line. The characteristics intrinsic to the different technologies used, and the specific execution of their implementation in each specific application also influences the actuators' capacity to react and adjust their state to set-point conditions sent from the control with speed, i.e. the dynamic response capacity thereof. Electric motors with and without supervision position, are typically used as stepper motors and servo motors, which typically act directly or through reducers or mechanical flow stopcocks of different types. The inertias of their masses, the friction of their different elements, the limitations of motor torque available in executions with space or power supply limitations, etc. are limiting aspects in those applications that require high dynamic response capacity to satisfactorily regulate the flow. There are also other types of actuators, such as, for example, the proportional solenoid valves controlled, for example, by pulse width modulation which, in certain applications, in some special executions, and with suitable control electronics, offer considerably superior dynamic responses to those of the aforementioned motor, also being competitive in terms of electric consumption and space necessary for its execution.

Also known in the state of the art is the use of ultrasound transducers to determine the average instantaneous speed, and the average instantaneous temperature of a known fluid medium that circulates through a tube of known geometry and which is located in said ultrasound transducers.

SUMMARY OF THE INVENTION

The liquid mixing device dynamic regulation and its operating method according to the present invention manages to resolve the cited drawbacks, having other advantages which will be described in the present specification.

The present invention has the purpose of the realization of a mixing device with electronic control system characterized in that it has a high dynamic response in the regulation of the mixture to changes in the temperature and pressure characteristics of the liquids supplied.

This is possible thanks to the quasi-instantaneous measurement of the flow and temperature values of said liquids supplied in each one of the fluid supply lines and the regulation of the partial flow of each one of them by means of high dynamic actuators which vary and adjust the flow of each and every one of the liquids individually and coordinated to obtain and maintain the demanded mixed liquid conditions, resulting from the passage through the device, according to the flow and temperature parameters set by the user or by the values pre-programmed by CPU or similar systems of indication to the device of the characteristics of the mixed liquid to supply.

To determine the instantaneous flow and the average instantaneous fluid temperatures which circulate through the different supply lines to the mixing device, the invention uses the principle of ultrasound measurement, which enables performing a high number of measurements in a short time interval, possibly being in the order of up to hundreds of hertz, and with the number of measurements, unlike other flow and temperature measurement principles, being independent from the fluid speed. This is an evident advantage for a mixing device like the object of the invention since in this way it is possible to obtain information from the transducers every few milliseconds, which, entered in the calculation algorithm, allows having, immediately and with a high cadence, the instantaneous flow and instantaneous temperature data necessary to supply the regulation algorithm of the proportional solenoid valves.

The propagation speed of a sound wave in a specific direction and sense in a liquid depends on several factors, among them the liquid wherein it is propagated, e.g. fresh water and the speed of the liquid in that direction and sense. The basic operating principle of ultrasonic flowmeters consists of measuring the difference in times a pair of sound pulses take to travel a known difference in a tube of known geometry, one of which is propagated in favour of the flow and the other against the flow, i.e. in the same direction and opposite senses, and from these time determining by calculation the instantaneous speed and the average instantaneous temperature of the fluid which traverses said tube in the section where the measurement is taken.

The propagation speed of a sound wave in a fluid medium typically varies with the temperature of the medium wherein said wave is propagated. The case may arise that the liquid, as occurs with fresh water in liquid state, has its propagation speed increase as the water temperature increases, having a maximum, which in the example of fresh water is around 73° C., after which the propagation speed decreases as the temperature continues increasing until reaching boiling temperature. From this it results that for a certain temperature range of the liquid, knowing the distance between the transducers and from the also known information on propagation speed of the waves in that liquid, it is not possible to univocally determine the temperature of said liquid, since there are two possible solutions, one which corresponds to a temperature less than that of the maximum or inflection point of the temperature-speed curve, and another which corresponds to a temperature greater than that of said inflection point.

Therefore, if liquid flows through any of the supply lines of the mixing device at a temperature which is within said range of temperatures it is impossible to univocally determine the liquid temperature of that line exclusively by the principle of ultrasound measurement. This has an evident problem for liquid mixing systems, such as, for example, that of cold and hot water, wherein the temperature of the hot water supply can typically exceed the inflection point of the speed-temperature curve at 73° C.

In the present invention, advantageously, there is a mixing device with electronic control with two or more supply lines of liquid to mix wherein each one of the supply lines has a section wherein at least two ultrasound transducers are placed, so that one acts as sound wave emitter and the other acts as receiver thereof, and vice-versa, performing measurements in favour of the flow and counterflow.

At minimum, in those liquid supply lines wherein the temperature thereof may be, due to the supply characteristics, in the range of uncertainty mentioned above, the device, to discriminate the side of the speed-temperature curve to which the speed measurement determined through the principle of ultrasound measurement corresponds and, therefore, univocally resolve the liquid temperature, it advantageously incorporates a second sensor in the vicinity of the ultrasound transducers based on another of the existing technologies and capable of univocally determining if the temperature of the liquid medium is above or below the maximum point of the propagation speed curve with respect to the temperature of said liquid.

This second auxiliary sensor has no practical use as a primary element to determine the temperature of liquids in the supply lines of a high regulation dynamics device, due to the slowness in the measurement in comparison with the ultrasound measurement technology and the consequent negative effect it produces on said regulation dynamics. The control system will only consult the data provided by this second auxiliary sensor in the event of having a propagation speed value of the sound wave obtained by the ultrasound measurement system which is included in the range of values which does not univocally allow determining the temperature by this method and exclusively to determine the side of the speed-temperature curve wherein the temperature to which the measured speed corresponds is found.

As mentioned, this additional auxiliary temperature sensor is only required to be installed in those lines wherethrough a liquid flows whose properties and anticipated temperature range may cause said uncertainty, so that they will preferably only be installed in said lines, with the consequent saving in temperature sensors corresponding to the rest of the supply lines of liquids to mix that do not need it.

Said second temperature sensor is preferably placed in the hydraulic line after the measuring section of the transducers in the sense of the liquid flow, so as to not generate turbulences in the liquid that may affect the measurements taken by the transducers.

The information provided by the sensors, transducers and auxiliary temperature sensor are processed by the electronic control system, whereto said sensors are connected, in their typical computing means using algorithms and calculation formulae that incorporate additional information relating to the known dimensions of the tubes in the measuring sections and liquids used. The instantaneous flow and average instantaneous temperature data are provided to the actuators' regulation algorithm, which adequately modify the restriction of the passage of different fluids increasing or decreasing the flow of the supply lines which allow the device to deliver the mixture according to the set-point values given, for example, by the user through the control interface of the mixing device. These actuators are elements capable of very quickly varying the restriction to the passage of fluids according to the orders of the electronic control system, as the proportional control solenoid valves preferably are.

The different components of the liquid mixing device such as, at least, the liquid supply lines, the measuring sections of each one of the supply lines with their corresponding sensors, the regulation means of flow delivered to the mixture for each one of the supply lines, the mixing chamber and each one of the outlet lines of the mixed liquid, are configured so that, preferably, they are installed in the same casing to form a liquid mixing supply assembly together with, at least, one tap, a control device, integrated in the tap or outside it and the necessary means for the installation thereof.

Each one of the supply line inlets connects with its corresponding measuring section, in which two transducers are positioned connected to the processing means of the control system, the surfaces of the transducers emitting and receiving the pressure waves propagated by the medium, preferably directly opposite one another and aligned with the flow direction, at a known distance, in direct contact with the medium but insofar as possible outside the liquid flow path so as to not excessively influence said flow creating more turbulences, not generating blind cavities where, due to sedimentation, solid dragged particles or particles in suspension in the liquid may deposit that can interfere in the measurement throughout the useful life of the mixing device.

Within the variability of the tubes used in the liquid supply lines and, in particular, in the mixing devices with electronic control, tubes are used with diameters preferably between 8 mm and 30 mm. With these measurements, it has been tested and checked that the separation between transducers must not be less than 30 mm, since smaller separations have a greater percentage of error than 5% in the flow readings, due to the local flow disturbances that it has been verified are caused by the transducers in the areas adjacent thereto. Above this 30 mm separation, for said diameter range applied in the measuring section tubes, it is possible to obtain a sufficiently precise measurement of flows and temperatures.

Likewise, it has been tested and checked that, for said diameters, the separation must not, in turn, be preferably greater than 250 mm so as to not undergo an unacceptably high attenuation of the signal received, with amplitude less than 10 mV for peak voltage of 3 V in the emission pulse and difficult to process by the control electronics in a reliable and precise manner and allow its installation in the casings of compact devices.

To be able to integrate measuring sections of sufficient length so that the measurements, as indicated, are acceptably precise in compact casings, together with the other elements that form the liquid mixing device, the inlet and outlet sections of liquid to the measuring sections where the transducers are installed opposite one another outside the path of the liquid flow, have been disposed at opposite ends and, preferably, perpendicular to said measuring sections. In the meeting area of the inlet and outlet sections with the measuring section, a radius has been disposed in the inner elbow, which significantly decreases the turbulence of the liquid in the section wherein the fluid changes direction and which would significantly affect measurement quality. For tubes with diameter of 8 mm to 30 mm, the radius of the inner elbow is 2 mm to 10 mm thus eliminating, in the flow range of 0.1-25 l/min, detachments of the limit layer in the meeting corner of the two tubes that generate local turbulences and reflux. The executions with greater radii occupy more volume and do not significantly contribute to improving the result.

With the same purpose of decreasing the turbulence in the measuring section, in order to be able to have such short sections with precise measurement, and optionally, stabilization or normalization means of the fluid speed profile are installed throughout the tube section in the entry section in a position close to the meeting with the measuring section. This reduces the inertial or convective forces of the fluid in the central area of the tube encouraging the flow in laminar regime in the measuring section, which improves the precision of the measurements taken in each one of the supply lines of liquid to mix in the mixing device object of the present invention.

Once said measuring sections are passed, the supply lines with liquids whose anticipated temperature ranges do not allow the univocal determination of the fluid temperature by the ultrasound measurement method, additionally incorporate an auxiliary temperature sensor, typically with calibrated resistance or a semiconductor, wherein an electrical property varies with the temperature, as indicated.

Once the liquids abandon said measuring areas, the device carries the liquids to the regulation means, where each regulation means for each supply line is formed, preferably, by a proportional solenoid valve which, following the orders of the device control system, varies the passage of the liquid of said line to be able to obtain the mixture with the characteristics set by the user, being able to even totally close the passage, for example in the event that mixture may be hazardous for the user or considerably different to that desired.

In this way, we have a measurement system of the liquid flow parameters of each one of the supply lines, and a flow regulation of each one of the lines, with a high dynamic, which allows the device to react practically immediately to variations in the flow and/or liquid temperature parameters of the supply lines to maintain the set-point conditions of the mixed liquid that is delivered to the user, all this being performed in a device that adapts to the measurements of the compact casings typically available on the market.

The device has an operating method that starts from the user's set-point on the control means, tap or other means where it indicates the parameters of how it is desired to supply the liquid, wherein the control system executes different actions, including, at least, the following steps:

electrically exciting a transducer operated as emitter and measuring the time the pressure wave takes to traverse the liquid detecting the electric signal generated by the other transducer operated as receiver. The time elapsed between the emission and the reception of the electric signal is called flight time.

Next, the process described in the previous step is repeated, but in the opposite direction, i.e. emitting a pressure wave from the transducer that previously operated as receiver and which in this step will act as emitter and measuring the time elapsed until reaching the transducer.

The control system, thanks to its processing means, with the flight time measurements in favour of and against the liquid flow, and knowing the geometry of the tube in the measuring section between the two transducers, the distance between the transducers and the physical properties of the fluid wherethrough the pressure wave is propagated, determines the average instantaneous fluid speed practically immediately after which it is possible to calculate the instantaneous flow which traverses the tube.

To cancel the effect of the temperature in the sound speed calculation, it is necessary to measure the flight times in favour of and against the flow. The fluid speed (υ) calculation follows the following formula:

$$v = \frac{L}{2}\left(\frac{1}{t_{down} - t_{nusr} + t_{zo}} - \frac{1}{t_{up} - t_{nusr} - t_{zo}}\right)$$

Where
L is the distance between transducers,
$t_{down}$ is the flight time in favour of the flow,
$t_{up}$ is the flight time against the flow,
$t_{nusr}$ is the null ultrasound execution time, i.e. the time it takes the sound wave to travel sections of the route that are perpendicular to the direction of the flow (mainly reflected in some geometries), and
$t_{zo}$ the flight time in resting state, i.e. a water flow speed equal to zero.

Next, the processing means obtain the liquid flow that flows through the tube (Q), multiplying the speed calculated by the known tube section:

$Q = v * A_{tube}$

Where
υ is the average instantaneous speed of the flow and
$A_{tube}$ the tube section.

Once the temperature has also been calculated with this high-dynamic measurement, and therefore, with a high frequency of information update of the state of each one of the inlet liquid lines to the device, the control system with the parameters set by the user sends the instructions to the solenoid valves in charge of the regulation of the mixing proportion of each one of the lines, or of closure to avoid problems in the supply.

In those inlet liquid lines in the device which, for the reasons already mentioned, incorporate an auxiliary temperature sensor, the system uses the measurement of said sensor to discern if the liquid temperature is in the temperature section below the maximum or in the temperature section greater than this maximum which has the behaviour curve of the wave propagation speed according to the liquid temperature, thus resolving the uncertainty already explained.

In the present description, the geometry measurements indicated as diameters may have their equivalent in tube sections and sections of different geometry to the strictly cylindrical, which has its equivalent sections in measurements to those indicated.

BRIEF DESCRIPTION OF THE SEVERAL VIEWS OF THE DRAWINGS

For a better understanding of the aforementioned, drawings are attached wherein, schematically, and only by way of non-limiting example, practical embodiments are represented.

DETAILED DESCRIPTION OF THE INVENTION

Figure 1:
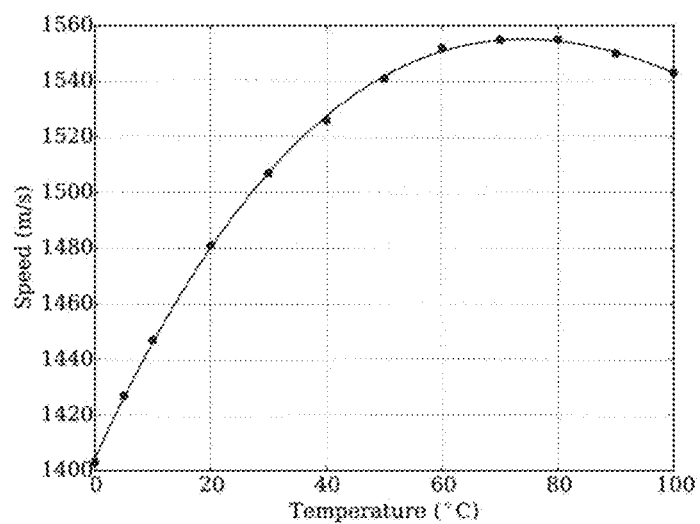
FIG. 1 is a graph that shows the relationship between propagation speed of the sound waves in fresh water and that typically supplied through the distribution networks for human consumption and the temperature of said water.

In the present preferred embodiment of the invention, there is a mixing device (10) with two water supply lines, hot (11) and cold (12), with electronic control of the measurement of the flow and temperature of each one of the lines (11, 12) and regulation of the mixture by means of proportional solenoid valves (15, 16) governed by an electronic control system (19).

Figure 2:
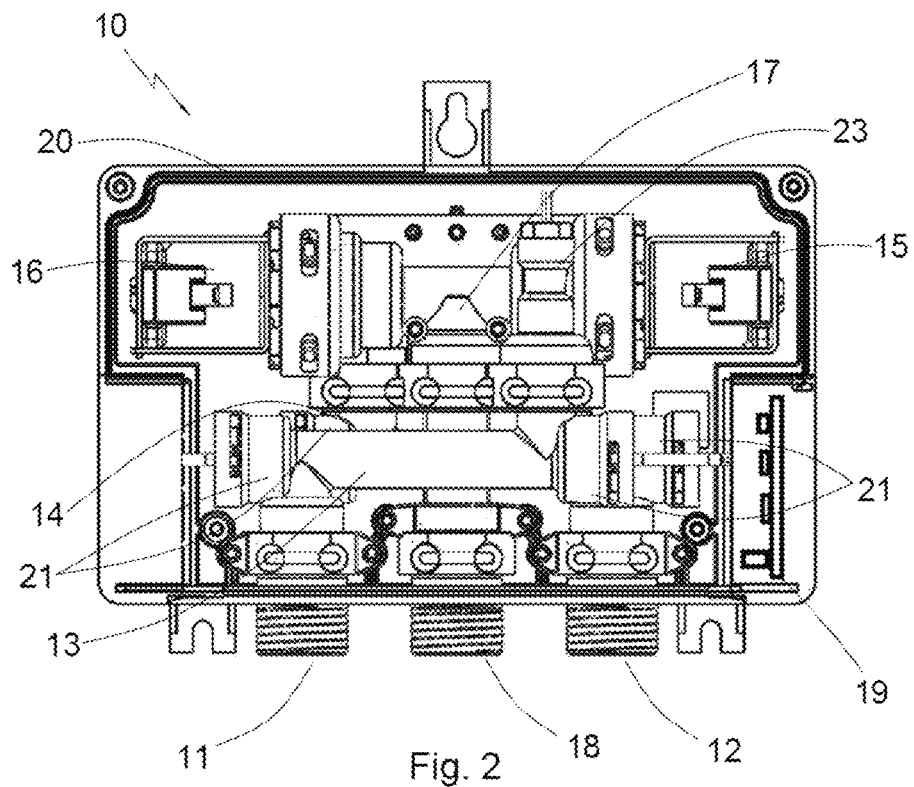
FIG. 2 is a schematic view of a high dynamic regulation mixing device with electronic control system for its application in the mixing of domestic water, having a cold-water inlet and a hot water inlet, in its box with the upper lid removed. In the present figure, the measuring section (14) is covered by the measuring section (13), as can be seen by the placement of the transducers of said section (14) that protrude on its right.

Said mixing device (10), as shown in FIG. 2, is included in a protective casing (20), which makes the assembly compact and integrating the assembly of the inlet supply lines (11, 12), the measuring sections (13, 14), the proportional solenoid valves (15, 16), the mixing chamber (17) and the outlet line (18) of the mixed water to the supply tap, not shown in the figures, and the electronic processing components corresponding to the control system (19).

The measuring sections (13, 14) are positioned after each one of the supply line inlets (11, 12), appreciably perpendicular to them, each measuring section (13, 14) having an ultrasound transducer (21) at each one of its ends, opposite one another and without neither them (21) nor their associated elements interfering with the water flow avoiding turbulences.

Figure 3:
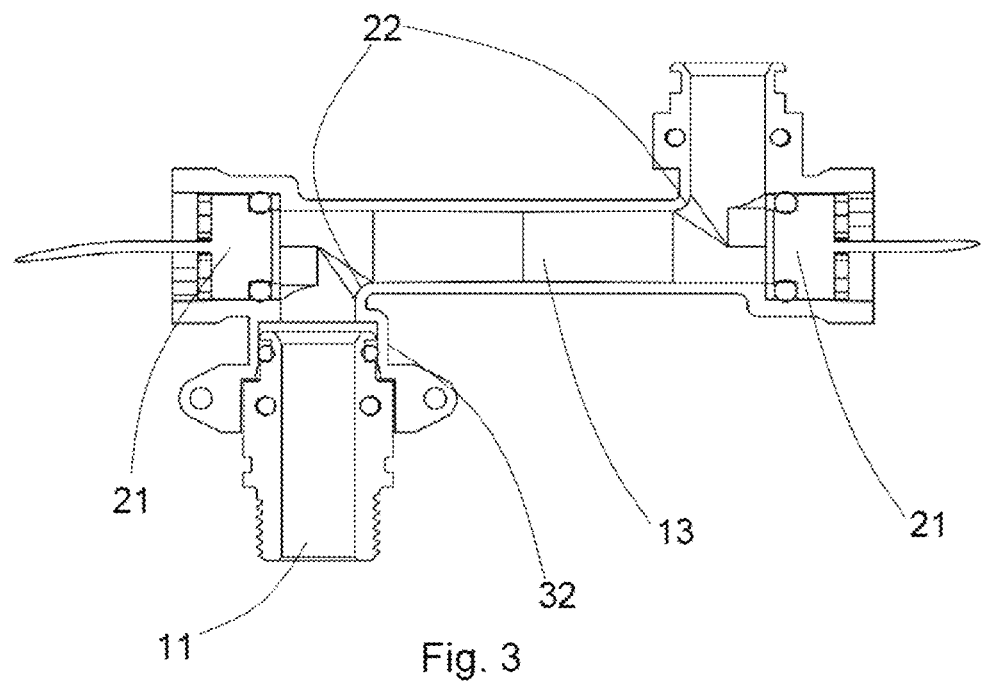
FIG. 3 is a sectional view of the measuring section with the transducers connected.

The measuring sections (13, 14) have in the present embodiment a diameter of 10 mm and, as can be seen in FIG. 3, in their connection with the inlet and outlet tubes to them, they have an inner radius (22) of 2.5 mm that avoids the creation of a turbulent flow due to the sudden change in direction of the flow and which allows having a mainly laminar regime in the central area of said water flow in the measuring section (13, 14), allowing flow readings with an error less than 2% in the 0.1-25 l/min flow range.

Figure 4:
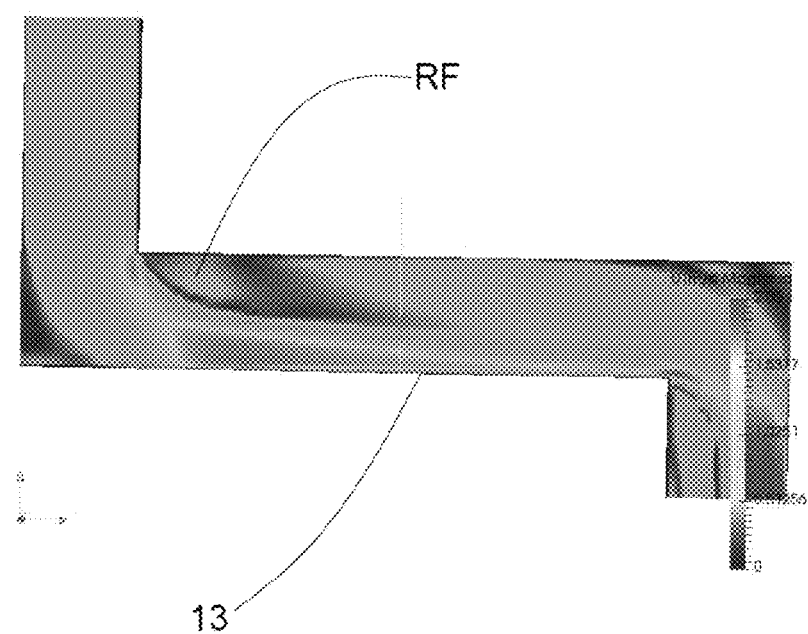
FIG. 4 is a Computational Fluid Dynamics simulation in the measuring section of 70 mm length and 10 mm diameter with a connection of the inlet and outlet tubes at 900 without elbows that have inner radii.
Figure 5:
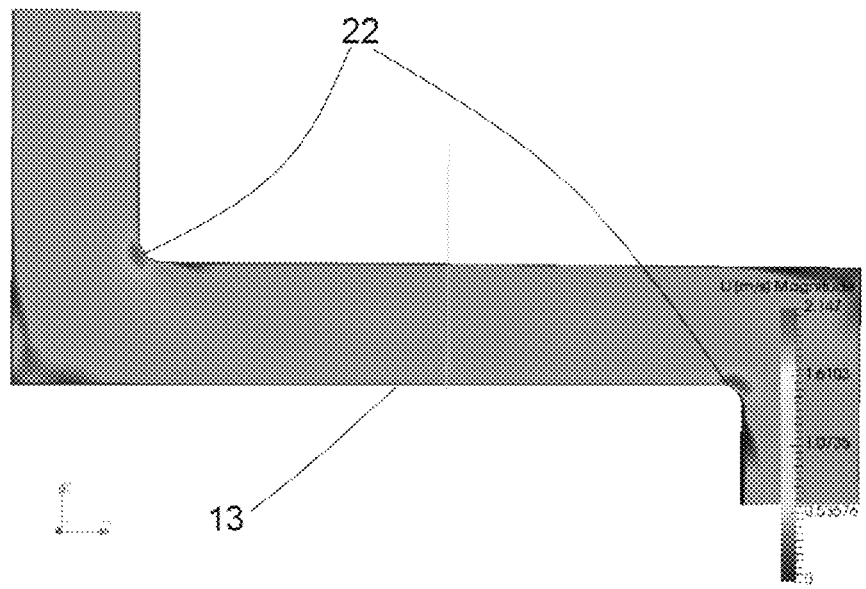
FIG. 5 is a Computational Fluid Dynamics simulation in the measuring section of 70 mm length and 10 mm diameter with a connection of the inlet and outlet tubes at 900 with elbows that have radii less than 2 mm.
Figure 6:
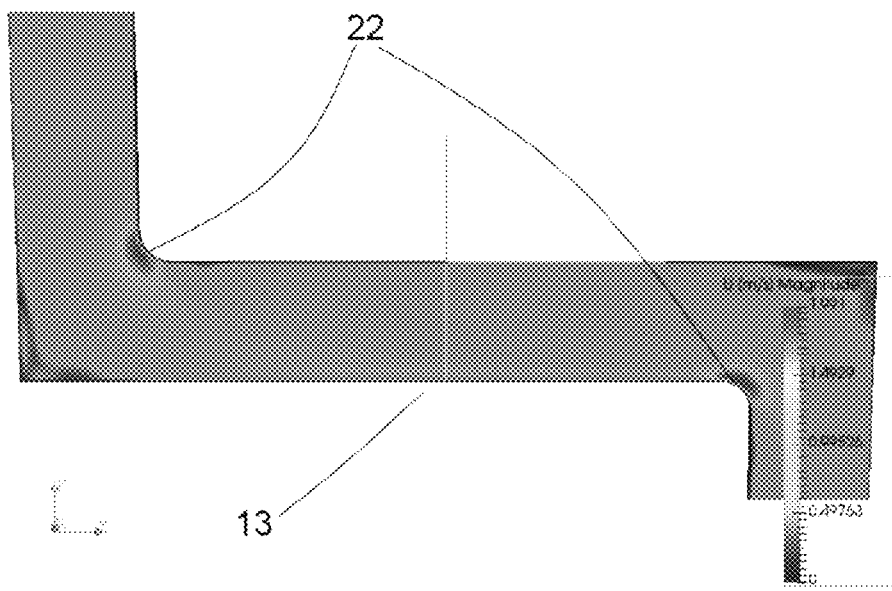
FIG. 6 is a simulation in the measuring section of 70 mm in length and 10 mm diameter with a connection of the inlet and outlet tubes at 900 with elbows that have radii less than 3 mm.

In FIGS. 4, 5 and 6, it is possible to observe the different speeds experienced in said change in direction areas depending on whether it has one inner radius (22) or another or its absence, having in the axis of the measuring section (13, 14) a more stable speed regime the greater the inner radius (22), so that the measurement is taken with less distortion by said turbulences. In particular, for inner radii (22) of 2.5 mm, a variation in averages of the flow speed in the central section of the measuring section less than 5% is obtained, in comparison with the configuration lacking radii in the water flow change in direction elbows. In said configuration without radii, reverse flow (RF) may even occur in the water flow change in direction elbows, in large areas close to the inlet corner to the change in direction, as shown in FIG. 4. As can also be seen in said FIGS. 4, 5 and 6, a large improvement is not obtained in the laminar state of the flow for elbow radii (22) between 2 and 3 mm in tubes with 10 mm diameter, so that increasing the radius to have a better laminar regime is inefficient since it involves greater manufacturing cost, due to having greater tube diameters and transducers. Hence, the 2.5 mm and, alternatively 3 mm radius are those considered suitable for measuring section tubes (13, 14) with 10 mm diameter.

The opposing ultrasound transducers (21) are found in the present embodiment at 70 mm in a tube with 10 mm diameter, which allows having a margin of error less than 2% in the 0.1-25 l/min flow range and, therefore, supplying reliable and precise information continuously to the electronic control system (19), thanks to obtaining reading voltages by the transducers of wave peak received of approx. 90 mV and precise with said margin of error less than 2%, previously mentioned, facilitating its installation in casings with typical measurements of between 100 and 300 mm in length in the direction in which the measuring sections are positioned.

In alternative embodiments, as indicated, it is possible to have measuring sections (13, 14) with a diameter comprised as widely as possible between 8 and 30 mm, where in an also preferred alternative the diameter will have a value between 9 and 15 mm.

The inner radii (22) will have, alternatively, a value of 2 mm to 10 mm.

The distance between the ultrasound transducers (21), alternatively, shall be greater than 30 mm and less than 250 mm, and, in an also preferred alternative embodiment, they will have a value of the distance between them (21) of 60 to 120 mm.

Figure 7:
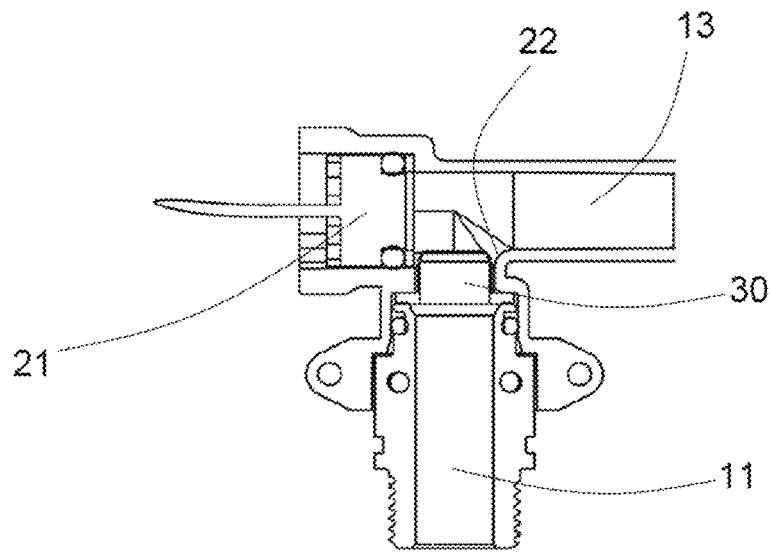
FIG. 7 is a sectional view of the detail of the measuring section in its connection area with the inlet supply line.

Alternatively, as is shown in FIG. 7, stabilization filters (30) of the flow regime may be included in the inlet line to the measuring section (13, 14), by way of stabilization or normalization means of the fluid speed profile.

A temperature sensor (23) is installed in the hot water line after the outlet of the measuring section (13) and before the proportional solenoid valve (15) of said hot water line, that connects to electronic control system (19) as auxiliary temperature sensor. The information from this auxiliary temperature sensor (23) shall only be required by the electronic control system (19) in the event that the hot water is delivered in the temperature range, or close to it, that does not allow calculating a univocal sound wave propagation speed value, as can be observed in FIG. 1, for values between 50° C. and 100° C. Thus, this auxiliary temperature sensor (23) will allow the electronic control system (19) to discern if the water is above or below 73° C., with a temperature sensor not being necessary for each water line, since the one corresponding to cold water, as it does not reach these temperatures, thanks to the advantageous measurement method applied, allows it (23) to be dispensed with, the measurement and calculation performed by the transducers (21) in the corresponding measuring section (13, 14) sufficing.

The control system (19) starts from the creation of pulses in the form of ultrasonic pressure waves in one of the transducers (21), acting as emitter, so that by traversing the water flow in its same direction, the wave reaches the opposite transducer (21), which acts as receiver in a certain time ($t_{down}$). Immediately after this, this transducer (21) which has acted as receiver changes its function to emitter and sends another pressure wave in counterflow direction, being detected by the first transducer in a determined time ($t_{up}$).

The electronic control system (19) has processing means that receive said measurements taken, which correspond to a high number of measurements in a short time interval, as previously described, which can be in the order of up to several hundred hertz, in the present embodiment approximately 250 Hz, being able to obtain information from the transducers (21) approximately every 4 milliseconds, where said information entered in the calculation algorithm of the processing means, makes it possible to immediately have, and with a high cadence, the instantaneous flow and instantaneous temperature information necessary to supply the regulation algorithm that the processing means also have, corresponding to the regulation of the proportional solenoid valves (15, 16).

As the electronic control system knows, due to the indication of the system programmer, the tube's geometry in the measuring section (13, 14), the distance between the transducers (21) and the physical properties of the water wherethrough the pressure wave propagates, determine the average instantaneous speed of the water practically immediately after which it is possible to calculate the instantaneous flow which traverses the tube.

To cancel the effect of the temperature in the sound speed calculation, the flight times in favour of and against the flow must be measured. The calculation of the fluid speed (u) follows the following formula:

$$v = \frac{L}{2}\left(\frac{1}{t_{down} - t_{nusr} + t_{zo}} - \frac{1}{t_{up} - t_{nusr} - t_{zo}}\right)$$

Where
L is the distance between transducers,
$t_{down}$ is the flight time in favour of the flow,
$t_{up}$ is the flight time against the flow,
$t_{nusr}$ is the null ultrasound execution time, i.e. the time it takes the sound wave to travel sections of the route that are perpendicular to the direction of the flow (mainly reflected in some geometries), and
$t_{zo}$ the flight time in resting state, i.e. a water flow speed equal to zero.

Hence, the processing means obtain the water flow that flows through the tube (Q) multiplying the speed calculated by the known section of the measuring section (13, 14):

$$Q = v * A_{tube}$$

Where
$v$ is the average instantaneous speed of the flow and
$A_{tube}$ the tube section.

The electronic control system (19), once the temperature has been calculated with this high-dynamic measurement, and therefore, with a high frequency of information update of the state of each one of the inlet water lines (11, 12) to the device, said control system (19) with the parameters set by the user sends the instructions to the proportional solenoid valves (15, 16) in charge of the regulation of the mixing proportion of each one of the lines, or of closure to avoid problems in the supply.

In the event of total removal of the power supply from the proportional solenoid valves (15-16), for example, due to the fact that the user decides to switch off the device (10), or in the event a failure occurs in the power supply to the device (10), the proportional solenoid valves (15-16) return to their resting position totally closing the passage of fluids they regulate.

Each one of the regulated flows is mixed in the mixing chamber (17) to exit through the outlet line (18) which will connect with the supply tap, so that it forms a distribution assembly. Alternatively, there may be several outlet lines (18) that connect with different supply taps.

Figure 8:
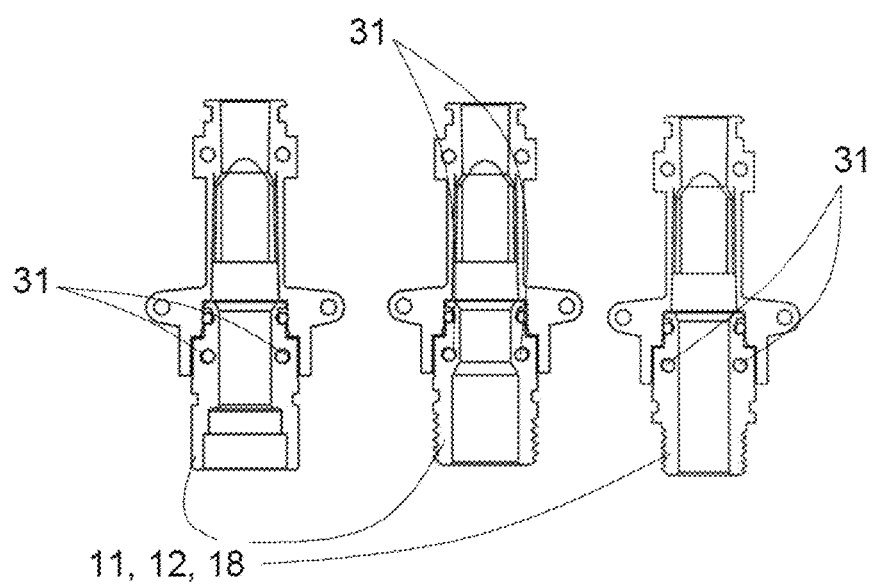
FIG. 8 is a sectional view of three possible inlet or outlet lines that are exchangeable according to socket type or diameter.

Optionally, as shown in FIG. 8, there is the possibility of having the inlet or outlet lines (11, 12, 18) which are coupled to the inlet or outlet tube (32), whether of the measuring section (13, 14) or of the mixing chamber (17), with coupling and solidly joining means (31) between said inlet or outlet lines (11, 12, 18) and the inlet tube (32) which allow their exchange and modification by threaded parts or of coupling socket of the inlet or outlet line (11, 12, 18) of the type required, as quick connection inlet or outlet lines, different diameters, special connections. These coupling and solidly joining means preferably form openings in the section of the inlet or outlet lines (11, 12, 18) wherein a detachable clip is mounted to facilitate its fixing and extraction. Furthermore, each liquid inlet or outlet line (11, 12, 18) will have their corresponding sealing gaskets.

Despite the fact that reference has been made to a specific embodiment of the invention, it is evident for a person skilled in the art that the liquid mixing device with electronic control of high dynamic regulation is susceptible to numerous variations and modifications and that all the details mentioned can be replaced by other technically equivalent ones, without departing from the scope of protection defined by the attached claims

What is claimed is:

1. A liquid mixing device with electronic control of high dynamic regulation, of those which have two or more liquid supply lines, said device performing measurements to know the conditions of the supply liquids, receiving set-point values of the parameters of a mixed liquid to supply regulating, according to the measurements and the set-point, having actuators which vary the flow provided to a mixing chamber through each one of the supply lines, from which at least one mixed liquid outlet line will exit, characterized in that each one of the supply lines has a measuring section wherein are located, at least, two ultrasound transducers so that one acts as wave emitter and the other as receiver thereof, and vice-versa, to perform flight-time measurements of the waves emitted in the medium both in the direction in favour of the flow and against the flow, where the mixing device has an additional auxiliary temperature sensor based on a different technology to ultrasound measurement, installed at minimum in the lines wherethrough liquids flow whose anticipated temperature is within a range which does not allow univocally relating temperature and wave propagation speed by said liquid, exclusively from the ultrasound measurement method, the transducers and the auxiliary temperature sensor being connected to an electronic control system which acts on flow regulation means of each one of the supply lines which provide liquid to the mixing chamber.

2. The liquid mixing device according to claim 1, wherein the mixing device has a configuration such that the transducers are opposite one another and aligned with the direction of the flow in the measuring section, outside the path of the liquid flow, having a distance between transducers greater than 30 mm and less than 250 mm, with the measuring section having a diameter between 8 mm and 30 mm, and, in the meeting area of the inlet and outlet sections with the measuring section, a radius has been disposed in the inner corner forming an elbow with a diameter between 2 mm and 10 mm.

3. The liquid mixing device to claim 2, wherein the mixing device has a configuration such that the transducers are opposite one another having a distance between them of 60 mm to 120 mm.

4. The liquid mixing device to claim 2, wherein the mixing device has a configuration such that the tubes that form the measuring section have a diameter between 9 mm and 15 mm.

5. The liquid mixing device to claim 2, wherein the mixing device has a configuration such that the transducers are opposite one another having a distance between them of 70 mm, where the measuring section is of 10 mm diameter, having an elbow with radius of 2.5 mm in the inner corners that form the meeting point of the inlet and outlet sections with the measuring section.

6. The liquid mixing device to claim 1, wherein the mixing device has a configuration such that the additional auxiliary temperature sensor is located after the measuring section.

7. The liquid mixing device to claim 1, wherein the mixing device has a configuration such that the additional auxiliary temperature sensor is only installed in the lines wherethrough liquids flow whose anticipated temperature is found within a range which does not allow univocally relating temperature and wave propagation speed by said liquid, exclusively from the ultrasound measurement method.

8. The liquid mixing device to claim 1, wherein the mixing device has stabilization means or normalization means of the fluid speed profile throughout the tube section in the entry section in a position close to the meeting point with the measuring section.

9. The liquid mixing device to claim 1, wherein the mixing device has proportional solenoid valves by way of flow regulation means of each one of the liquid supply lines towards the mixing chamber.

10. The liquid mixing device to claim 1, wherein the liquid inlet or outlet lines are parts which are coupled to the inlet or outlet tube, whether of the measuring section or of the mixing chamber, with coupling and solidly joining means between said inlet or outlet lines and the inlet tube which allow their exchange and modification by threaded parts or coupling socket of the inlet or outlet line of the type required.

11. The liquid mixing device to claim 1, wherein the mixing device is installed under the same casing with the corresponding supply lines and outlet lines protruding.

12. An operating method of a liquid mixing device with electronic control of high dynamic regulation as indicated in claim 1, of those which have an electronic control system which receives the information of the measurements taken by the different sensors or devices and sends actuation orders on the flow-regulation solenoid valves of the different lines, characterized in that the control system executes, at least, the following steps:

electrically exciting a transducer operated as emitter and measuring the time the wave takes to traverse the liquid detecting the electric signal generated by the other transducer operated as receiver;

repeating the process described in the previous step but in the opposite direction, i.e. emitting a wave from the transducer which previously operated as receiver and which, in this step, will act as emitter and measuring the time it takes to reach the other transducer;

determining the average instantaneous fluid speed thanks to its processing means, with the measurements of the flight times in favour of and against the flow of the liquid, knowing the geometry of the tube in the measuring section between the two transducers, the distance between the transducers and the physical properties of the fluid wherethrough the wave is propagated, practically immediately after which it is possible to calculate the instantaneous flow which traverses the measuring section;

calculating the fluid speed (v) with the control system algorithm;

Obtaining the liquid flow that flows through the measuring section multiplying the speed calculated by the tube section of the known measuring section;

once the temperature with a high dynamic measurement is known, and therefore, with a high frequency of information on the state of each one of the inlet liquid lines to the device, the control system, with the parameters set by the user, sends the instructions to the solenoid valves in charge of regulation of the mixing proportion of each one of the lines, or of closure to avoid problems in the supply, in those liquid lines of inlet to the mixing device which incorporate an auxiliary temperature sensor, the control system uses the measurement of said sensor to discern if the liquid temperature is found in the temperature section below the maximum or in the temperature section greater than this maximum, which has the behaviour curve of the wave propagation speed according to the liquid temperature, thus resolving the uncertainty which arises in said liquid supply lines.

13. The operating method according to claim 12, wherein the set-point values for the liquid to supply are flow and temperature parameters set by the user, by the values preprogramed by a CPU or similar systems of indication to the mixing device of the characteristics of the mixed liquid to supply.

* * * * *